United States Patent
Blyth et al.

(10) Patent No.: US 9,458,320 B2
(45) Date of Patent: Oct. 4, 2016

(54) PRE-SWELLED GROUND TIRE RUBBER AND METHODS OF MAKING AND USING THE SAME

(71) Applicants: Polymer Consultants, Inc., Valrico, FL (US); Innovative Polymer Solutions, Inc., Valrico, FL (US)

(72) Inventors: Peter C. Blyth, Tampa Bay, FL (US); David L. Bangs, Atlanta, GA (US)

(73) Assignees: Innovative Polymer Solutions, Inc., Valrico, FL (US); Polymer Consultants, Inc., Valrico, FL (US)

( * ) Notice: Subject to any disclaimer, the term of this patent is extended or adjusted under 35 U.S.C. 154(b) by 29 days.

(21) Appl. No.: 14/030,779

(22) Filed: Sep. 18, 2013

(65) Prior Publication Data

US 2015/0080505 A1    Mar. 19, 2015

(51) Int. Cl.
| | |
|---|---|
| C08L 95/00 | (2006.01) |
| C08K 5/01 | (2006.01) |
| C08L 21/00 | (2006.01) |
| C08L 17/00 | (2006.01) |
| C08L 91/00 | (2006.01) |
| E01C 7/26 | (2006.01) |

(52) U.S. Cl.
CPC ............... *C08L 95/00* (2013.01); *C08K 5/01* (2013.01); *C08L 17/00* (2013.01); *C08L 21/00* (2013.01); *C08L 91/00* (2013.01); *C08L 95/005* (2013.01); *E01C 7/265* (2013.01); *C08L 2555/34* (2013.01); *C08L 2555/52* (2013.01)

(58) Field of Classification Search
CPC ............... C08J 3/00; C08J 3/05; C08K 3/34; C08K 3/346; C08K 3/26; C08K 5/01; C08L 23/22; C08L 21/00; C08L 95/00; C08L 2555/52; C08L 2555/34
USPC ............................................. 521/41; 524/64
See application file for complete search history.

(56) References Cited

U.S. PATENT DOCUMENTS

| | | |
|---|---|---|
| 4,203,837 A | 5/1980 | Hoge et al. |
| 4,437,896 A | 3/1984 | Partanen |
| 5,385,401 A | 1/1995 | Nath |
| 5,460,649 A | 10/1995 | Strassman |
| 5,492,561 A | 2/1996 | Flanigan |
| 5,501,730 A | 3/1996 | Duong et al. |
| 5,558,704 A | 9/1996 | Masuda et al. |

(Continued)

FOREIGN PATENT DOCUMENTS

| | | |
|---|---|---|
| WO | WO9317076 A2 | 9/1993 |
| WO | WO2007068990 A1 | 6/2007 |
| WO | 2009/042675 | 4/2009 |

OTHER PUBLICATIONS

Notice of Allowance, dated Dec. 31, 2014, received in connection with related U.S. Appl. No. 13/705,634.

(Continued)

*Primary Examiner* — Frances Tischler
(74) *Attorney, Agent, or Firm* — Meunier Carlin & Curfman LLC

(57) ABSTRACT

Disclosed herein are compositions and methods relating to rubber compositions, comprising crumb rubber and a maltene-like oil, which provides simultaneous rut, crack, moisture, and temperature resistance in both dense grade and gap grade paving mixtures. Also disclosed are methods of producing the rubber compositions, and methods of using the same.

30 Claims, 6 Drawing Sheets

(56) References Cited

U.S. PATENT DOCUMENTS

| | | | |
|---|---|---|---|
| 5,683,498 A | 11/1997 | Hesp | |
| 5,704,971 A | 1/1998 | Memon | |
| 5,719,215 A | 2/1998 | Liang et al. | |
| 5,836,524 A | 11/1998 | Wang | |
| 5,936,015 A | 8/1999 | Burns | |
| 6,271,305 B1 | 8/2001 | Rajalingam et al. | |
| 6,444,731 B1 | 9/2002 | Memon | |
| 6,538,060 B2 | 3/2003 | Rajalingam et al. | |
| 6,786,961 B2 | 9/2004 | Honma et al. | |
| 6,786,963 B2 | 9/2004 | Matherly et al. | |
| 6,855,754 B2 | 2/2005 | Takamura et al. | |
| 7,087,665 B2 | 8/2006 | Sylvester et al. | |
| 7,157,508 B2 | 1/2007 | Dean | |
| 7,267,231 B2 | 9/2007 | Gabl | |
| 7,384,468 B2 | 6/2008 | Butler et al. | |
| 7,439,219 B2 | 10/2008 | Scheibel et al. | |
| 7,538,080 B2 | 5/2009 | Scheibel et al. | |
| 7,547,356 B2 | 6/2009 | Partanen | |
| 7,550,631 B2 | 6/2009 | Scheibel et al. | |
| 7,705,068 B2 | 4/2010 | Mellott, II et al. | |
| 7,811,373 B2 | 10/2010 | Partanen et al. | |
| 7,816,446 B2 | 10/2010 | Shahidi et al. | |
| 7,902,277 B2 | 3/2011 | Reinke et al. | |
| 7,910,633 B2 | 3/2011 | Mellott, II et al. | |
| 8,758,597 B2 | 6/2014 | Osborn | |
| 2002/0009622 A1 | 1/2002 | Goodson | |
| 2006/0096503 A1* | 5/2006 | Lee et al. | 106/670 |
| 2009/0084287 A1* | 4/2009 | Partanen et al. | 106/273.1 |
| 2010/0048771 A1* | 2/2010 | Osborn | 524/70 |
| 2012/0022182 A1 | 1/2012 | Ranka | |

OTHER PUBLICATIONS

International Search Report and Written Opinion, dated Feb. 18, 2015, received in connection with corresponding International Application No. PCT/US2014/056368.

Non-final Office Action, dated Jun. 6, 2014, received in connection with U.S. Appl. No. 13/705,634.

* cited by examiner

PRE-SWELLED GROUND TIRE RUBBER AND METHODS OF MAKING AND USING THE SAME

BACKGROUND

Over 300 million scrap tires are generated a year in North America. These scrap tires take up large amounts of space in landfills or are illegally dumped, providing breeding grounds for mosquitoes and rodents. Large stockpiles of scrap tires also have the potential for fires that are detrimental to the environment and extremely hard to extinguish.

Fortunately, markets now exist for most of the scrap tires generated each year. The major market for scrap tires, at some 47% of all recovered used tires, is tire derived fuels. The second largest single market for ground tire rubber ("GTR"), utilizing significantly smaller mesh sizes than that found in tire derived fuels, consumed approximately 31% of the available scrap tires. This GTR is incorporated into bituminous (e.g., asphalt) paving material as a cost reduction and performance enhancement additive that consumes over 18 million tires a year.

Approximately 94% of all roads in America are paved and all states are aggressively searching for ways to lower material costs and improve asphalt performance. With twenty one states currently using rubber modified asphalt, GTR containing asphalt is projected to eclipse landscape cover as the number one scrap tire consuming market within the next several years.

Blending GTR with asphalt can produce a pavement with a number of advantages such as longer lasting road surfaces, reduced road maintenance due to lesser cracking and rutting, reduced pavement thickness, lower road noise, and shorter breaking distances. According to the Rubber Pavements Association, a 2.5 cm thick overlay of hot-mix asphalt will consume about 2,000 tires per lane mile with seal coats consuming about 500 tires per lane mile when spray applied. Therefore, using rubber-containing asphalt is an effective way to reduce the problematic stockpiles of scrap tires.

Blending rubber with asphalt can, however, be challenging. Rubber particles are generally insoluble in asphalt and can settle out of the asphalt mixture during storage or transport. Also, blending is often done at high temperatures, which swells the rubber and increases the viscosity of the mixture. Reheating or prolonged heating during storage tends to devulcanize the rubber, physically degrading the overall performance properties of the rubber particulate. It can also eliminate the particulate nature of the GTR and lead to loss of the desirable improvements in physical properties and lower costs that can be attained by the use of GTR enhanced asphalt. These phenomena limit the opportunities for using rubber-containing asphalt mixtures, requiring that such mixtures be used within a short period after their manufacture and in the vicinity of the manufacturing facility.

Several methods have been tried to improve the storage and transport stability of rubber-containing asphalt mixtures. For example, light hydrocarbon solvents or highly aromatic, high-boiling mineral oil have been added to such mixtures. These methods are, however, costly and of questionable environmental impact. Other methods devulcanize the rubber with high temperatures and/or adding oxidizers or devulcanization agents. However, such methods are capital intensive and therefore costly, require additional steps, and can use reactive agents. Another strategy for resolving these issues has been to use mobile mixing units that mix the GTR and asphalt on site. Such units are expensive and they may not routinely be available.

It is thus desirable to improve the processes of incorporating rubber into bituminous materials like asphalt. A method that can improve the stability and ease-of-use of such mixtures is desirable. Mixtures that are easier to use and have greater stability have increased opportunities for use, which ultimately means that the benefits of using these materials can be realized in more locations and that there can be further reductions in the number of scrap tires in landfills.

SUMMARY

In accordance with the purposes of the disclosed materials and methods, as embodied and broadly described herein, the disclosed subject matter, in one aspect, relates to compositions and methods of making and using the compositions. In a further aspect, the disclosed subject matter relates to rubber compositions comprising crumb rubber and a maltene-like oil. These compositions can provide simultaneous rut, crack, moisture, and temperature resistance when used in both dense grade and gap grade paving mixtures, which previously has not been achieved from traditional crumb rubber compositions.

Further disclosed herein are methods of producing rubber compositions for use in paving mixtures. The disclosed methods comprise heating a crumb rubber with a maltene-like oil, in the substantial absence of a bituminous mixture, to form a composition which provide simultaneous rut, crack, moisture, and temperature resistance in both dense grade and gap grade paving mixtures.

Also disclosed herein are methods of preparing paving compositions. The disclosed methods comprise combining, in any order, a rubber composition as disclosed herein, a bituminous material, and aggregate to form a mixture and then mixing the mixture. The mixture can then be used as pavement.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

Figure 1:
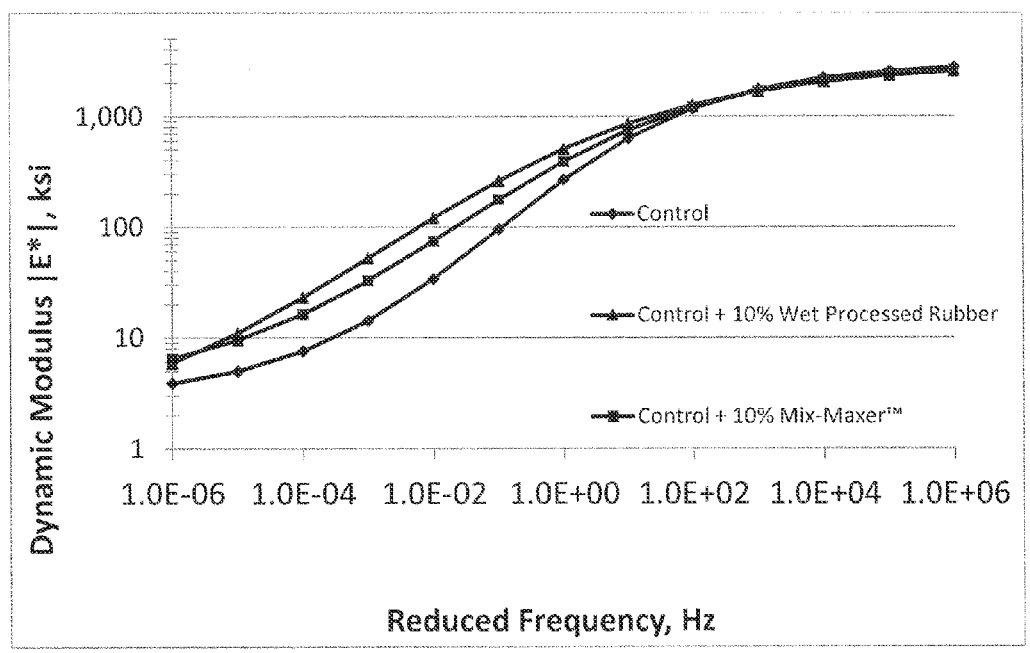
FIG. 1 is a comparison master curve of dynamic modulus for 9.5 mm dense graded mixture. Addition of both Wet Process Rubber and a rubber composition as disclosed herein has provided desirable stiffness to the Superpave/Dense Grade mix at high temperatures as seen on the left side of the graph. The left side was run at 40° C. and the right side was run at 4° C.

In the figures "Mix-Maxer™" refers to rubber compositions as disclosed herein.

DETAILED DESCRIPTION

The materials, compounds, compositions, and methods described herein may be understood more readily by reference to the following detailed description of specific aspects of the disclosed subject matter, and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

DEFINITIONS

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a crumb rubber" includes mixtures of two or more such crumb rubbers, reference to "an asphalt mixture" includes mixtures of two or more such asphalt mixtures, reference to "the aggregate" includes mixtures of two or more such aggregates, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Further, unless stated otherwise, the term "about" means within 5% (e.g., within 2% or 1%) of the particular value modified by the term "about."

A weight percent (wt. %) of a component, unless specifically stated to the contrary, is based on the weight of the bituminous material (e.g. asphalt). For example, 12 wt. % GTR would mean there is 12% GTR by weight of asphalt.

Reference will now be made in detail to specific aspects of the disclosed materials, compounds, compositions, articles, and methods, examples of which are illustrated in the accompanying examples.

Rubber Compositions

Disclosed herein are rubber compositions that comprise crumb rubber and a maltene-like oil. These compositions, when included into either dense grade or gap grade paving mixtures, provide simultaneous rut, crack, moisture, and temperature resistance. This has not been achieved with traditional rubber compositions or preparation methods. By "rut, crack, moisture, and temperature resistance" is meant that the paving mixture is more resistant to rutting, cracking, moisture, and temperatures (heat and/or cold) than a control, 10% untreated dry rubber, or 10% wet processed rubber (see Examples). For example, the rubber compositions disclosed herein can be 1, 2, 3, 4, 5, 6, 7, 8, 9, 10, 15, 20, 25, 30, 35, 40, 45, or 50 or more times more resistant to ruts, cracks, moisture and temperatures than a control or than other forms of rubber.

The rubber compositions disclosed herein may not include a bituminous mixture, or there can be a substantial absence of bituminous mixture, such as less than 1, 2, 3, 4, 5, 6, 7, 8, 9, or 10% by weight. The rubber compositions are also prepared in the substantial absence of a bituminous material, such that there is less than 1, 2, 3, 4, 5, 6, 7, 8, 9, or 10% by weight bituminous material present when the crumb rubber is heated with maltene-like oil.

The rubber compositions disclosed herein pass all standard rutting resistance tests and moisture resistance tests, as can be seen in the Examples, when incorporated into paving mixtures. Example 5 shows improved low temperature crack resistance when compared to traditional wet process rubber. The rubber compositions disclosed herein also have improved overlay test results when compared by other rubbers by a factor of 15 times in Dense Grade mixes and 4.3 times in Gap Grade mixes (Example 4). The rubber compositions disclosed herein exceed the performance of the control in the Overlay test in Gap Grade mixes. It also has 50% better mix workability than other rubbers subjected to the wet process (Example 6). It out-performs all other rubber and polymer additives by simultaneously passing the Hamburg test (Example 3) while also providing significantly elevated Overlay results even to the point of exceeding the control of a Gap Grade mix.

Other advantages of the rubber compositions disclosed herein are that they can be directly added to a mix without first wet processing the rubber in hot asphalt, and that it does not require the expensive, distance-limited (due to settling) transportation of wet processed rubber in asphalt. Furthermore, it can be conveniently packaged, such as in low-melt 50 lb plastic bags that can be directly added to the mix.

Maltene-Like Oils

There are many suitable maltene-like oils that can be used with the methods and compositions disclosed herein. By "maltene-like oil" is meant any oil that resembles a maltene in its properties or nature. Maltenes constitute the fraction of asphalt which is soluble in n-alkane solvent such as pentane and heptane. Their chemical characteristics are as follows: they contain smaller molecular weight versions of asphaltenes called "resins." They can contain aromatic hydrocarbons with or without O, N and S (also called "first acidaffins.") They can contain straight chained or cyclic unsaturated hydrocarbons called oleifins (also called "second acidaffins.") They can contain cyclic saturated hydrocarbons known as naphthenes (also called "saturates.") They can contain straight or branch chain saturated hydrocarbons (also "saturates."). Their molecules are also known as "naphthene-aromatics."

It is desirable that the maltenes have a flash point in excess of about 400° F. to avoid the need to provide an inert gas blanket on the process; although, oils with lower flash points can be used with an inert gas blanket if desired. Examples of suitable oils are products such as kerosene, fuel oil, or motor oil. Suitable kerosenes are defined in ASTM D3699-87. Suitable fuel oils are as defined in ASTM D396. Specific examples of fuel oils include, but are not limited to, #4, #5 or #6 fuel oil, which are frequently recycled products. Other examples of suitable oils are refined motor oils in a wide range of weight classifications such as 5W, 30W, 60W or 90W. For example, #5 fuel oil was used, which yielded the further benefit of being recycled in nature as is the rubber. Interestingly, the rubber compositions as disclosed herein can preferably have 98% recycled content. Still further the maltene-like oil can be a diesel fuel/oil as defined ASTM D975. These oils can be either refined or rerefined or recycled oils. These oils can include single weight and multi grade oils that can be petroleum or synthetic or bio based in nature.

Crumb Rubber

The rubber used with the methods and compositions disclosed herein can be, for example, crumb rubber. "Crumb rubber" refers to rubber that is used as a modifier in bituminous materials such as asphalt. Any crumb rubber can be used in the disclosed methods and compositions. Crumb rubber generally contains a variety of rubber polymers, including styrene-butadiene rubber (SBR), styrene-butadiene-styrene rubber (SBS), natural rubber and its synthetic analog (cis-polyisoprene), cis-polybutadiene, butyl rubber (copolymer of isobutylene and isoprene), polybutylene, EPDM rubber, polychloroprene (neoprene), nitrile rubber (acrylonitrile butadiene), polyacrylonitrile, and the like. Often crumb rubber comprises predominantly styrene-butadiene rubber. The crumb rubber can either be synthetic or natural rubber particles. The crumb rubber can be either vulcanized or devulcanized, or mixtures of both; however, the best results are obtained when the crumb rubber is not devulcanized or oxidized.

Crumb rubber of varying particle sizes can be used herein. In most examples, crumb rubber with a sieve designation of greater than or equal to about 4 mesh (i.e., the crumb rubber particles can fit through sieve opening of less than or equal to about 4760 μm) can be used herein. In other examples, crumb rubber with a sieve designation of from about 4 to about 240 mesh, from about 10 to about 170 mesh, from about 14 to about 80 mesh, from about 1 to about 30 mesh, from about 10 to about 60 mesh, from about 15 to about 30 mesh, or from about 80 to about 240 mesh can be used. Specific examples, included crumb rubber with a sieve designation of about 4 mesh, about 10 mesh, about 14 mesh, about 30 mesh, about 80 mesh, or about 170 mesh can be used. In general, the higher the mesh number used the higher the viscosity of the mixture. So using an 80 mesh crumb rubber particles would result in a mixture with higher viscosity than a 30 mesh crumb rubber particles.

The correlation of sieve designations (mesh size) to sieve opening size is provided below. Any of the mesh or corresponding sieve opening values can form an upper or lower endpoint of a range.

| Mesh | Sieve opening (μm) |
|---|---|
| No. 4 | 4760 |
| No. 5 | 4000 |
| No. 6 | 3360 |
| No. 7 | 2830 |
| No. 8 | 2380 |
| No. 10 | 2000 |
| No. 12 | 1680 |
| No. 14 | 1410 |
| No. 16 | 1190 |
| No. 18 | 1000 |
| No. 20 | 841 |
| No. 25 | 707 |
| No. 30 | 595 |
| No. 35 | 500 |
| No. 40 | 420 |
| No. 45 | 354 |
| No. 50 | 297 |
| No. 60 | 250 |
| No. 70 | 210 |
| No. 80 | 177 |
| No. 100 | 149 |
| No. 120 | 125 |
| No. 140 | 105 |
| No. 170 | 88 |
| No. 200 | 74 |
| No. 230 | 63 |

Crumb rubber can be obtained commercially from a variety of sources. The major source of crumb rubber is from scrap tires and is referred to as ground tire rubber (GTR). In general, GTR is produced by first shredding tires down to about 0.15 m2 pieces in a shear tire shredder with two counter, rotating shafts. The tire shreds are then further reduced in size by using either an ambient or cryogenic system. In an ambient system, the shreds are fed at ambient temperature (i.e., at or above ordinary room temperature) into one or more granulators, fitted with screens that determine the size of the output. Steel is removed from the resulting material by magnets and fiber is removed by aspiration and sifting so that only rubber particles remain.

Crumb rubber can also be produced by processing the shredded or granulated rubber through one or more "cracker mills." These mills have two counter-rotating corrugated rolls placed very close together that "cracks" and tears the rubber into smaller particles as it passes through.

Another ambient method uses solid-state shear extrusion (SSSE) pulverization to obtain a fine rubber powder. In an SSSE process, rubber granulates are subjected to compression shear strain in a single screw extruder. The screw design provides a decreasing channel depth to exert compression, while the relative movement of the screw with respect to the barrel wall ensures the shearing of the granulates. Cooling elements remove the heat dissipated during pulverization to reduce or eliminate agglomeration of the fine particles and the viscoelastic relaxation of the stresses at elevated temperatures. The particles produced by SSSE processes generally have a very high surface area compared to those produced by other processes, due to their irregular shape. In addition, the produced particles are partially devulcanized due to high shear and compression forces applied during the pulverization process.

In a cryogenic system, the tire shreds are super-cooled using liquid nitrogen. The cold rubber, now extremely brittle, is processed through a hammer mill, which shatters the rubber into small particles. The output is dried and classified into specific gradations. Smaller particles can usually be produced with the cryogenic process than with an ambient system. It requires fewer pieces of equipment than the ambient system and energy and maintenance costs may be less. A drawback of the cryogenic process is the cost of liquid nitrogen. As such, the cryogenic process is generally more expensive than other methods.

In the disclosed methods and compositions, any crumb rubber can be used, e.g., ambient ground crumb rubber, ambient cracker milled crumb rubber, ambient SSSE crumb rubber, or cryogenic crumb rubber. The cryogenic crumb rubber exhibits a certain regularity of shape when examined by scanning electron microscope (SEM) techniques and reveals particles having generally planar surfaces of relatively low surface area, as might be expected from the fracturing of the cryogenically frozen crystalline tire rubber. In contrast, ambient processed (e.g., shredded, cracker milled or conventionally ground) crumb rubber particles are irregular in appearance with extended tendrils resulting from the pulling apart and shredding of the rubber structure and possess a much higher surface area as compared to the particles produced by the cryogenic process. The irregular texture of such rubber particles also results in a higher reaction rates partially due to higher surface to volume ratios. Glassy, angular cryogenically ground rubber particulate has a demonstrated slower reaction rate partially due to lower surface to volume ratios. So in the disclosed methods and compositions, ambient ground crumb rubber is well suited, and ambient cracker milled crumb rubber is very well suited. Cryogenically ground rubber can be used, but is less preferred than ambient ground rubber.

Methods of Producing Rubber Compositions

Disclosed herein are methods of producing a rubber composition for use in paving mixtures. The methods can comprise heating a crumb rubber with a maltene-like oil to form a composition. The mixture produced by this method is referred to herein as "the rubber composition," "the rubber mixture", or "a rubber composition as disclosed herein." Such terms are used interchangeably throughout. By heating the crumb rubber with the maltene-like oils, in the substantial absence of bituminous material, a pre-swelled rubber composition can be produced and which has surprising benefits in paving applications.

The process temperature and time in the methods of producing the rubber compositions disclosed herein can vary. The higher the temperature, the more rapid the process proceeds, and the less time that is required to heat the composition. The composition can be heated to anywhere from about 250, about 275, about 300, about 325, about 350, about 375, about 400, about 425, about 450, or about 500° F., for as long as about 15 minutes, about 30 minutes, about 45 minutes, about 60 minutes, about 75 minutes, about 90 minutes, or about 2, about 3, about 4, about 5, about 6, about 7, about 8, about 9, about 10, about 11, about 12 or more hours, where the states values can form an upper or lower endpoint of a range. In a preferred example, one can heat the mixture at about 350° F. for about one hour.

The mixture of crumb rubber and maltene-like oil can be mixed to varying degrees using containers and mixers common in the field. The amount of mixing depends on the viscosity of the mixture, temperature, the amount and type of rubber, and the amount and type of maltene-like oil. In most cases, the mixture is continuously stirred so as to create and maintain a homogeneous contact of the crumb rubber with the maltene-like oil. A mixing blender such as a ribbon blender or, preferably, a paddle blender can be used. The mixture can be left for months or years before being packaged without the nature of the rubber changing. In other words, this process does not "activate" the rubber in any way.

The heating of the rubber composition can be accomplished in multiple ways. For example, the mixture can be subjected to microwave radiation. A microwave heater can raise the temperature of a large rubber mix to about 375° F. quickly, depending upon the amount of applied microwave energy. Other methods of raising the rubber temperature include a stirred vessel with a hot oil or steam jacketed exterior. Additional methods to raise the temperature involve the use of shear energy applied in a paddle blender operating at high speed.

The mixture can be heated in one blender, then transferred to a second blender and held with stirring to complete the swelling process. The resultant swelled rubber can then be transferred to a third blender and cooled. For example, the mixture can be cooled through a chilled water jacketed system.

The mixture can then be cooled at either ambient temperatures, or in a cooling chamber.

After cooling, the mixture can be treated with a high surface-to-volume ratio powder. The high surface-to-volume ratio powder can be less than about 0.5, about 1, about 2, about 3, about 4, about 5, about 6, about 7, about 8, about 9, about 10, about 11, about 12, about 13, about 14, about 15, about 16, about 17, about 18, about 19, or about 20 microns. In one example, the powder can be less than about 10 microns. Examples of the powder to be used can include, but are not limited to, sand, talcum powder, bentonite clay, 200 mesh rubber, hydrated lime or ADVERA™ WMA. Hydrated lime (calcium hydroxide, having the chemical formula $Ca(OH)_2$, and also known as slake lime and pickling lime) can be disbursed throughout the rubber composition to render it flowable. It can also be used to coat the rubber composition, which prevents clumping and improves flowability. Levels used can be about 1, about 2, about 3, about 4, about 5, about 6, about 7, about 8, about 9, about 10, about 11, about 12, about 13, about 14, about 15, about 16, about 17, about 18, about 19, or about 20% by weight, where any of the stated values can form an upper or lower endpoint of a range. The hydrated lime has about a 2 micron particle size and provides good flowability. In addition, lime is also frequently used in asphalt formulations as an anti-strip additive. But, its addition to the disclosed rubber compositions can later help the physical properties of the finished asphalt product. Additional amounts of lime can make the rubber flow more freely.

The disclosed methods can be performed in a stationary facility where the mixing of materials are performed away from the site where the road is being laid. It is also possible to perform the disclosed methods in a mobile unit, which can be positioned at various locations at or near where the road is being laid. One example of a mobile unit is a tank wagon that contains tanks for the crumb rubber and maltene-like oil, and optional other additives, as well as a mixing tank.

Methods of Preparing Paving Compositions

Also, disclosed herein are methods of preparing a paving composition that comprise a) combining, in any order, a rubber composition as disclosed herein and prepared according to the disclosed methods, a bituminous material, and aggregate to form a mixture; and then mixing the mixture.

The rubber composition is composed of crumb rubber and a maltene-like oil, and is discussed in more detail herein. Once the rubber composition is formed using the methods disclosed herein, it can be bagged and stored, and mixed at a later time into bituminous material for use in pavement. It can be conveniently packaged, such as in low-melt 50 lb plastic bags that can be directly added to the bituminous material and/or aggregate. Alternatively, the rubber composition can be mixed on site and immediately added to the bituminous material and/or aggregate and mixed.

Testing of the rubber mixture in a pavement mixture was performed using two different asphalt/stone mixes (Examples 1 and 2). One was a Dense Grade mix with 7% asphalt present also called a Superpave grade and the second was a Gap Grade mix otherwise known as an open grade mix with 6% asphalt present and in the test results referred to as RIDOT. The control was a pure, unmodified asphalt grade 58-28 to the same asphalt modified with 10% untreated dry rubber, or 10% wet processed rubber (cooked in asphalt at 350 F for one hour) or 10% of a rubber composition as disclosed herein. All tests were run in both Dense Grade and Gap Grade mixtures.

Figure 2:
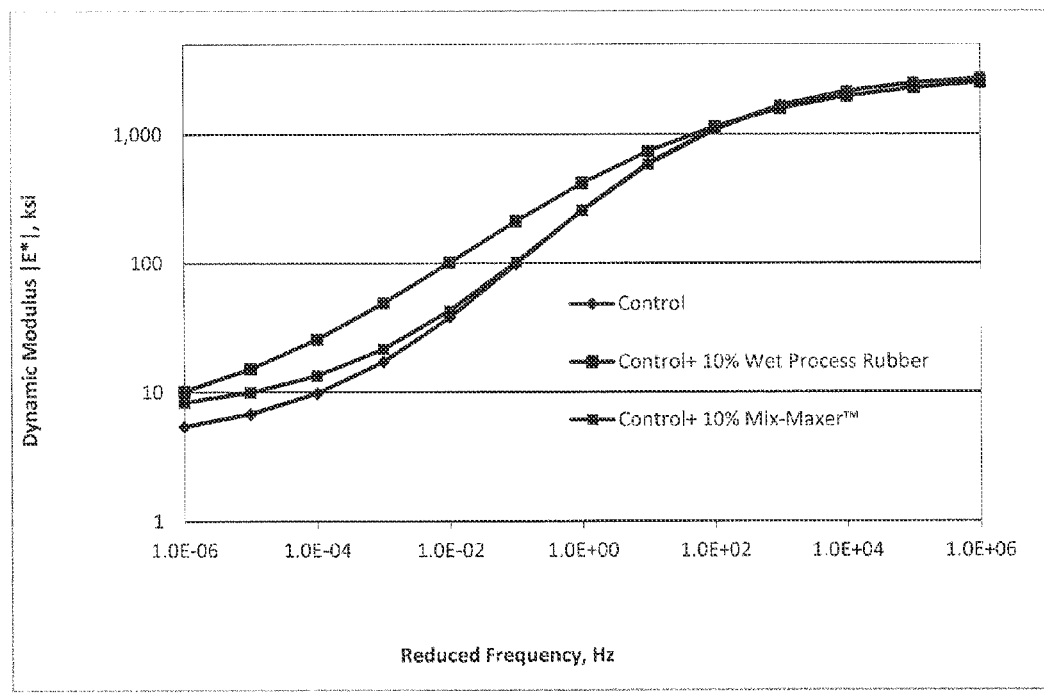
FIG. 2 is a graph master curve dynamic modulus for RIDOT elastomeric mixtures. Addition of both Wet Process Rubber and a rubber composition as disclosed herein has provided desirable stiffness to the RIDOT/Gap Grade mix at high temperatures as seen on the left side of the graph. The left side was run at 40° C. and the right side was run at 4° C.

FIGS. 1 & 2 demonstrate that the addition of rubber (all types) lends stiffness to a mix at high temperatures (40° C.) which is desirable as it allows the asphalt surface to resist movement during the summer Movement leads to a breakdown in the asphalt surface. This is further confirmed by the Hamburg Test, which is a wheel that repeatedly rolls over a road surface (in the lab) until the surface fails due to excessive rutting. The control fails this test which is why asphalts are frequently modified either with a polymer such as Kraton or with rubber. Stripping is also tested in the Hamburg Test (Example 3) which is a measure of moisture resistance. Asphalt will routinely wash off of the stone and most mixes utilize some sort of added anti-strip compound to ensure that the asphalt does its job which is to hold the stone in place.

All rubbers, including the untreated dry rubber pass the Dense Grade Hamburg Test (Example 3). However, the Gap Grade Test is different. Again the control fails this test. All three rubbers—wet process, dry untreated, and the rubber composition as disclosed herein pass the rutting test, but only the wet process and disclosed rubber composition pass the stripping test.

The Overlay Test (Example 4) is a test that measures cracking resistance. Because pure asphalt is so elastic, it passes this test quite readily. Typical rubbers do not provide any benefit in this test but a rubber composition as disclosed herein provides 15× the normal crack resistance of other rubbers in a Dense Grade mix and it actually out-performs the control in a Gap Grade mix. The rubber composition as disclosed herein simultaneously performs well in the Overlay Test and the Hamburg test. No other rubber or asphalt modifier has been shown to accomplish this.

Asphalt mixes need to survive cold temperature conditions. Pure asphalt controls fail the −28° C. cold temperature cracking test (TSRST). Rubber helps a mix pass this test with wet process rubber just barely passing this test. The rubber composition disclosed herein easily passes this test.

One of the main complaints about rubber modified asphalts is their viscosity which is much higher than that of unmodified or polymer modified asphalt mixes. This makes them difficult to pump and compact on the road bed. The high viscosity is typically handled by maintaining the mixes at elevated temperatures which leads to vapor complaints by the workmen. It also requires extra work during the compaction phase of the laying the road bed. The rubber composition as disclosed herein only requires 50% of the normal additional torque required to work a rubber modified asphalt mix.

Bituminous Material

In the disclosed compositions and methods, various bituminous materials can be used. Examples of suitable bituminous materials for use herein include, but are not limited to, asphalt, tar, pitch, etc. A bituminous material includes, but is not limited to, various hydrocarbon mixtures that occur naturally or that are obtained synthetically, and that are used for surfacing roads or for waterproofing. Chemically, bituminous materials are complex aggregations of rather large aliphatic and cyclic hydrocarbon molecules.

Asphalt is a bituminous material suitable for use herein. Asphalts are highly complex materials containing both unsaturated and saturated aliphatic and aromatic compounds with up to a 150 carbon atoms. The composition will vary depending on the source and refining methods of the crude oil. Many of the compounds in asphalt contain oxygen, nitrogen, sulfur and other heteroatoms. Asphalt typically contains about 80% by weight of carbon, 10% hydrogen; up to 6% sulfur; small amounts of oxygen and nitrogen; trace amounts of metals such as iron, nickel, and vanadium. The molecular weights of the varied compounds in asphalt range from several hundred to many thousands.

The compounds are classified as asphaltenes or maltenes according to their solubility in hexane or heptanes. Asphaltenes are high molecular weight species that are insoluble in these solvents. Maltenes have lower molecular weights and are soluble. Asphalt normally contains between 5 and 25% by weight of asphaltenes and can be regarded as colloids of asphaltene micelles dispersed in maltenes.

Representative asphalts suitable for use herein include native rock, lake asphalts, petroleum asphalts, air-blown asphalts, sulfur-treated asphalt, reclaimed asphalts, cracked asphalts, or residual asphalts. The term "asphalt" also includes asphalt binder and asphalt cement.

Aggregate

The bituminous materials, rubber mixture, and optional fiber, can also be combined with a variety of aggregate material. Any aggregate suitable for use in road construction or related applications can be used. Either hydrophilic or hydrophobic aggregate can be used. Suitable aggregate can include various mineral materials, such as cinders or slags. It can also include RAP (recycled asphalt pavement) or RAS (recycled asphalt shingles). Typically an aggregate is of natural origin, such as sand, rock, gravel, or the like which is common to the localities where the roads are being built; for example, limestone, dolomite, silica, sedimentary, metamorphic, or igneous rocks of various kinds are regularly used in road construction or related applications. Other types of aggregate, such as gravel, granite, trap rock, sandstone, etc., can also be used. Aggregates referred to as "mineral aggregate" is also suitable. The aggregate can be present in a wide variety of amounts but generally is used in from about 90% to about 95%, from about 92% to about 94%, or from about 93% to about 95% by weight of the final paving composition. In many cases the amount of aggregate is about 93.5% by weight of the final paving composition, though the exact amount varies depending on the particular regulations of a given jurisdiction.

Fiber

In optional embodiments, the final mixture can also include added fiber. The level of residual ground fiber from the tires themselves can aid the suspension of the rubber. For example, adding a small quantity (e.g., about 0.25% by weight of bituminous material) of the finely ground fiber (e.g., about 30 mesh), settling of the crumb rubber is further reduced but the viscosity of the mixture increases only a small amount. Fiber can generally be added in an amount of from about 0.05% to about 1%, from about 0.1% to about 0.75%, from about 0.25% to about 0.5%, or from about 0.05% to about 0.5% by weight of the bituminous material. Fiber sizes that can be used are from about 4 mesh to about 80 mesh, from about 10 mesh to about 30 mesh, from about 4 mesh to about 14 mesh, or from about 14 mesh to about 60 mesh. In some examples the fiber material can be synthetic organic fibers as disclosed in U.S. Pat. No. 5,460,649, which is incorporated by reference herein in for its teaching of fibers, including, olefins, polyesters, acrylics, nylons, rayons, acetates, aramids, polyurethanes, and elastomers, and their use in asphalt compositions. Natural fibers made of cellulose can also be used.

Additional Materials

Various additives can be added to the final mixture in amounts of from about 0.05% to about 5.0%, from about 0.1% to about 4.0%, or from about 1.5% to about 3%, from about 0.05% to about 2.5%, or from about 3% to about 5% by weight of the bituminous material.

Waxes can also be used herein. Waxes such as SASO-BIT™ wax (Sasol North America Inc.) and montan wax (Strohmeyer and Arpe, N.J.) are usually used to lubricate the paving mixtures. Other suitable waxes include paraffin and non-paraffin waxes. Paraffin waxes include, but are not limited to, petroleum, petroleum-derived and refined waxes (slack wax and refined macrocrystalline wax) while non-paraffin waxes include, but are not limited to, natural waxes (e.g., animal, vegetable, and mineral waxes such as beeswax and carnuaba wax), modified natural waxes (e.g., brown coal derivatives such as montan wax and mineral oil derivatives), partial synthetic waxes (e.g., acid waxes, ester waxes, amide waxes, alcohol waxes and oxidized polyethylene waxes), and full synthetic waxes (e.g., Fischer-Tropsch waxes and polyethylene waxes). Such waxes can be used in amount of from about 0.05% to about 5.0% but in general are used at less than about 1.5 wt. % of the bituminous material.

Viscosity modifiers (VMS), dispersant viscosity modifiers (DVMS), and additives containing viscosity modifiers or dispersant viscosity modifiers, as well as extrusion processing aids, molding processing aids, polyolefins, or sulfur, can be used in the disclosed compositions and methods. Such additives include, but are not limited to, VMS and DVMS used in engine lubricating oils (e.g., polyisobutylenes, olefin copolymers, hydrogenated styrene-diene copolymers, styrene maleate copolymers, polymethacrylates, olefin-graft PMA polymers and hydrogenated polyisoprene star polymers) and products containing VMS and DVMS such as the residual bottoms from refined recycled engine lubricating oils; extrusion processing aids; molding processing aids (e.g., high trans content polyoctenamer reactive polymers); polyolefins, ethylene vinyl acetates; acrylic polymers; silicones; and elemental sulfur or sulfur derivatives (e.g., sulfur impurities used in fuels to provide lubrication properties). One type of additive that can be used are asphaltene and soot suspension agents, more commonly known as polybutadiene reacted succinic anhydrides (PIBSA), acids and esters and phenol based polyamines. These additives can be used in amounts as noted above.

Phosphoric acids or their derivates are also another class of additives that can, when incorporated into an asphalt mixtures at levels as low as from about 0.2 to about 1.0 wt. % provide lubrication of the asphalt mixture. Exemplary phosphoric acids include polyphosphoric acid (PPA) and superphosphoric acid (SPA). Phosphoric acid derivatives can be used in an amount of from about 0.1% to about 1.0%, from about 0.1% to about 0.5 wt %, or from about 0.5% to about 1.0% by weight of the mixture.

Further materials that can be used herein include reclaimed asphalt pavement (RAP), reclaimed asphalt shingles (RAS), organic and inorganic fibers such as polyolefin, cellulosic and mineral fibers, heavy metal soaps such zinc stearate to enhance adhesion, compounds containing Group IIA (e.g., Be, Mg, Ca, Sr, Ba), Group IIIA (e.g., Sc, La), Group IIIB (e.g., Al, Ga, In), copper, zinc, cadmium, manganese, iron, cobalt and nickel salts, and/or diamides derived from polyamines and polycarboxylic acids that serve as improved anti-strip agents.

Inorganic salts such as calcium chloride, sodium chloride and potassium chloride can also be added to improve the workability of the mixture. The mixture can also contain water-soluble polymers such as carboxymethyl cellulose and hydroxyethyl cellulose. Moreover, the mixture can contain polyphenol compounds such as tannin for the purpose of improving adhesion between aggregates and asphalt.

The disclosed compositions can be used, for example, as paving or roofing materials.

EXAMPLES

The following examples are set forth below to illustrate the methods, compositions, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or ° F., or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

All percentages are as a percent of the neat asphalt in the formulation.

Example 1

Performance Characteristics of Treated Ground Tire Rubber Added During the Mixing Process A treated ground tire rubber material has been developed for use in asphalt mixes. The rubber material was tested in standard mixes used in the New England area using the Rhode Island DOT mix gradation that has been established for use with elastomeric materials (this gradation is also commonly referred to as Gap Grade). The typical gradation specifications are provided in Table 1. The treated rubber was used in a Superpave mix and Elastomeric mix and the specific gradations are also included in Table 1.

TABLE 1

Average Aggregate Stockpile Properties and Mixture Gradation

| Sieve Size (mm) | 9.5 mm | Stone Sand | Natural Sand | 9.5 mm Superpave Specification | RIDOT Elastomeric Specification | Superpave Gradation Tested | RIDOT Elastomeric Gradation Tested |
|---|---|---|---|---|---|---|---|
| 19 | 100.0 | 100.0 | 100.0 | — | 100 | 100.0 | 100 |
| 12.5 | 100.0 | 100.0 | 100.0 | 100 min. | 100 | 99.7 | 100 |
| 9.5 | 100.0 | 10.0 | 100.0 | 90-100 | 91-95 | 97.1 | 92.4 |
| 4.75 | 74.1 | 99.8 | 99.7 | 90 max. | 40-45 | 66.8 | 44.2 |

TABLE 1-continued

Average Aggregate Stockpile Properties and Mixture Gradation

| Sieve Size (mm) | 9.5 mm | Stone Sand | Natural Sand | 9.5 mm Superpave Specification | RIDOT Elastomeric Specification | Superpave Gradation Tested | RIDOT Elastomeric Gradation Tested |
|---|---|---|---|---|---|---|---|
| 2.36 | 57.8 | 83.7 | 98.3 | 32-67 | 22-26 | 47.8 | 25.9 |
| 1.18 | 45.5 | 54.3 | 93.3 | — | — | 33.5 | 17.3 |
| 0.6 | 34.4 | 33.8 | 73.3 | — | 9-12 | 23.0 | 12 |
| 0.3 | 22.4 | 19.0 | 29.7 | — | 6-8 | 13.3 | 8 |
| 0.15 | 13.5 | 9.4 | 4.8 | — | — | 7.1 | 6.1 |
| 0.075 | 9.1 | 4.3 | 0.9 | — | 4 | 4.4 | 4.0 |
| $G_{sb}$* | 2.638 | 2.644 | 2.624 | — | — | — | — |
| Absorption | 0.76 | 0.53 | 0.45 | — | — | — | — |

— Not applicable
*Bulk Specific Gravity
RIDOT = Rhode Island Dept. of Transportation, Gap Grade or Open Grade specification
Superpave = Dense Grade specification The Superpave/Dense Grade Mix volumetric properties are provided in Table 2 for conventional mix (unmodified, no rubber added to the mix) with a standard performance grade PG 58-22 binder for the region, the same mix but with a wet processed rubber binder (the rubber was added to the binder first and held at 350 F for one hour with agitation before being added to the mix), and the rubber compositions disclosed herein material was added directly to the standard Superpave mix.

TABLE 2

9.5 mm Superpave/Dense Grade Mixture Volumetric Properties

| Mixture | Control 58-28 | Control & %10 Wet Process Rubber | Control & %10 Disclosed Rubber Composition | Spec. |
|---|---|---|---|---|
| Total Binder content | 6 | 6 | 6 | — |
| Virgin Binder Added, % | 6 | 6 | 6 | — |
| Air Voids, % | 3.5 | 4.6 | 4.9 | 4 |
| Voids in Mineral Aggregate % | 16.2 | 17.8 | 17.9 | 15 min |
| Voids Filled with Asphalt, % | 78.4 | 74.2 | 72.6 | 65-78 |
| Binder Absorbed, % | 0.53 | 0.18 | 0.3 | — |
| Dust to Binder Ratio | 0.75 | 0.73 | 0.7 | — |

— Not Applicable

The RIDOT/Gap Grade mix volumetric properties are provided in Table 3 for conventional mix (unmodified, no rubber added to the mix) with a standard performance grade PG 58-22 binder for the region, the same mix but with a wet processed rubber binder (the rubber was added to the binder first and held at 350° F. for one hour with agitation before being added to the mix), and the disclosed rubber compositions was added directly to the standard RIDOT/Gap Grade mix.

TABLE 3

9.5 mm RIDOT/Gap Grade Mixture Volumetric Properties

| Mixture | Control 58-28 | Control & %10 Wet Processed Rubber | Control & %10 Disclosed Rubber Composition | Spec. |
|---|---|---|---|---|
| Total Binder content | 7.5 | 7.5 | 7.5 | — |
| Virgin Binder Added, % | 7.5 | 7.5 | 7.5 | — |
| Air Voids, % | 4.3 | 4.7 | 4.8 | 4-6 |

TABLE 3-continued 9.5 mm RIDOT/Gap Grade Mixture Volumetric Properties

| Mixture | Control 58-28 | Control & %10 Wet Processed Rubber | Control & %10 Disclosed Rubber Composition | Spec. |
|---|---|---|---|---|
| Voids in Mineral Aggregate % | 19.7 | 21 | 20.5 | 18 min |
| Voids Filled with Asphalt, % | 78.2 | 77.6 | 76.8 | 65-78 |
| Binder Absorbed, % | 0.62 | 0.16 | 0.48 | — |
| Dust to Binder Ratio | 0.67 | 0.63 | 0.62 | — |

— Not Applicable

Example 2

Performance Tests

The mixes were subjected to standard mix performance testing. The Dynamic Modulus testing results are provided in Table 4 and FIG. 1 for Superpave/Dense Grade Mixes, and Table 5 and FIG. 2 for the RIDOT/Gap Graded mixes.
Dynamic Modulus of Hot Mix Asphalt (HMA)—AASHTO TP 62-07

TABLE 4

Dynamic Modulus E*obtained for 9.5 mm Superpave/Dense Graded mixtures
9.5 mm Superpave Mixtures

| Standard Frequencies $\omega_r$ | Control 58-28 E*, ksi | Control + 10% Wet Processed Rubber E*, ksi | Control + 10% Disclosed Rubber Composition E*, ksi |
|---|---|---|---|
| 1000000 | 2778.80 | 2562.89 | 2653.65 |
| 100000 | 2569.14 | 2344.81 | 2432.09 |
| 10000 | 2234.67 | 2053.12 | 2114.34 |
| 1000 | 1754.75 | 1688.56 | 1696.72 |
| 100 | 1174.88 | 1274.36 | 1214.43 |
| 10 | 632.18 | 860.53 | 749.10 |
| 1 | 267.75 | 509.32 | 391.32 |
| 0.1 | 95.80 | 262.91 | 177.10 |
| 0.01 | 34.08 | 121.05 | 74.80 |
| 0.001 | 14.24 | 52.46 | 32.73 |
| 0.0001 | 7.55 | 23.02 | 16.22 |
| 0.00001 | 4.99 | 10.96 | 9.47 |
| 0.000001 | 3.89 | 5.92 | 6.47 |

TABLE 5

Dynamic Modulus E* obtained for 9.5 mm RIDOT (Gap Grade) mixtures
9.5 mm RIDOT Mixtures

| Standard Frequencies $\omega_r$ | Control 58-28 E*, ksi | Control + 10% Wet Process Rubber E*, ksi | Control + 10% Disclosed Rubber Composition E*, ksi |
|---|---|---|---|
| 1000000 | 2731.36 | 2539.63 | 2732.63 |
| 100000 | 2508.57 | 2299.43 | 2506.45 |
| 10000 | 2161.16 | 1978.14 | 2152.39 |
| 1000 | 1676.56 | 1582.51 | 1659.46 |
| 100 | 1109.94 | 1148.48 | 1089.14 |
| 10 | 596.51 | 739.48 | 582.26 |
| 1 | 258.64 | 418.76 | 255.75 |
| 0.1 | 98.09 | 212.36 | 101.81 |
| 0.01 | 37.97 | 101.45 | 42.93 |
| 0.001 | 17.30 | 49.05 | 21.64 |
| 0.0001 | 9.82 | 25.68 | 13.46 |
| 0.00001 | 6.80 | 15.16 | 9.98 |
| 0.000001 | 5.44 | 10.17 | 8.36 |

Example 3

Hamburg Test

Figure 3A:
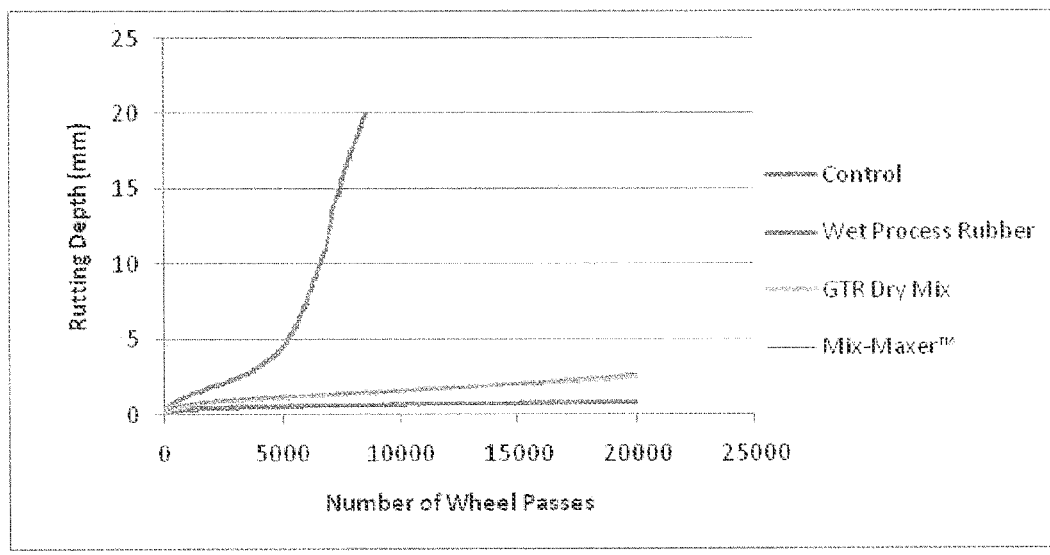
FIG. 3a is a comparison of Superpave/Dense Grade HWTD test results, which indicate that rubber diminishes rutting and moisture damage. In this figure, the curves for Dry Mix and the rubber composition as disclosed herein overlap.
Figure 3B:
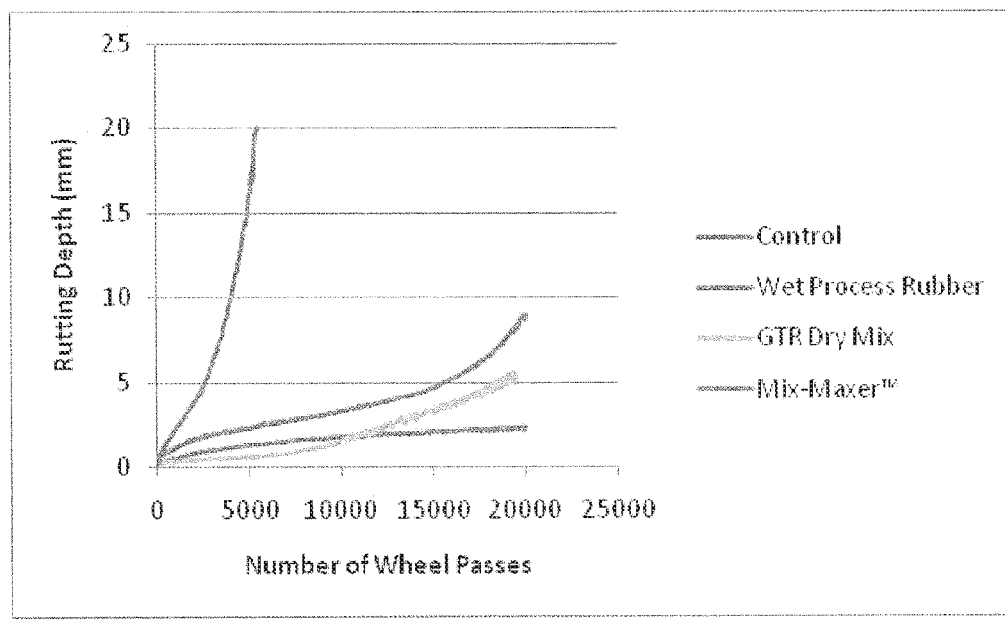
FIG. 3b is a comparison of RIDOT/Gap Grade HWTD test results, which indicates that rubber diminishes rutting and moisture damage.

The mixtures were then tested with the Hamburg Wheel Test Device to indicate both rut resistance and stripping inflection point (indicative of moisture resistance). A fourth mixture was included which contained an untreated dry rubber additive for comparative purposes. The Superpave/Dense Grade mix test results are provide in Table 6 and FIG. 3a. The RIDOT/Gap Grade mix test results are provided in Table 7 and FIG. 3b.

TABLE 6

HWTD 9.5 mm Superpave/Dense Grade test result - Hamburg Test

| Test results obtained | Control 58-28 | Control + 10% Wet Process Rubber | Control + 10% Untreated GTR Dry mix | Control + 10% Disclosed Rubber Compositions |
|---|---|---|---|---|
| Rut Depth at 10,000 Passes (mm) | >20 | 1.17 | 1.53 | 1.6 |
| Rut Depth at 20,000 Passes (mm) | >20 | 0.85 | 2.63 | 2.76 |
| Stripping Inflection Point from HWTD | 5300 | None* | None* | None* |

The HWTD tests resistance to rutting. The pure asphalt control failed all 3 tests. The addition of rubber significantly improves resistance to rutting. Failure in rutting is defined as a rut depth exceeding 12 mm after 20,000 passes. Rut depth of <3 mm is insignificant.

All rubber types passed the stripping inflection point test which is a moisture resistance test. Minimum stripping inflection point specifications for Mass. are 15,000 passes at a 45° C. test temperature.

TABLE 7

HWTD 9.5 mm RIDOT/Gap Grade test results - Hamburg Test

| Test results obtained | Control 58-28 | Control + 10% Wet Process | Control + 10% GTR Dry mix | Control + 10% Disclosed Rubber Compositions |
|---|---|---|---|---|
| Rut Depth at 10,000 Passes (mm) | >20 | 1.76 | 1.53 | 3.35 |
| Rut Depth at 20,000 Passes (mm) | >20 | 2.31 | 5.92 | 9.01 |
| Stripping Inflection Point from HWTD | 3,550 | None | 11,700 | 16,900* |

*Minimum stripping inflection point specifications for MA are 15,000 passes at a 45° C. test temperature. The disclosed rubber composition was run under the harsher conditions of 50° C. and was the only material that passed the stripping inflection test as a Gap Graded material. The control failed all 3 tests. Failure in rutting is defined as a rut depth exceeding 12 mm after 20,000 passes.

Example 4

Overlay Test

The mixes were then tested for crack resistance using the Overlay Tester. The Superpave/Dense Grade mix test results are in Table 8 and the RIDOT/Gap Grade mix test results are in Table 9.

TABLE 8

Overlay Results for Superpave/Dense Grade mixtures

| Test Result | Control 58-28 | Control + 10% Wet Process Rubber | Control + 10% GTR Dry Mix | Control + 10% Disclosed Rubber Composition |
|---|---|---|---|---|
| Average Overlay Test (OT) Cycles to Failure | 1004 | 20 | 10 | 289* |

*The rubber composition disclosed herein out performs all other rubber modifiers by a factor of 15X.

No other rubber or polymer modifier can provide this elevated level of performance and simultaneously perform well in the Hamburg Test. Usually there is a trade off when using rubber between rut and crack resistance. The disclosed rubber compositions yields favorable results in both tests.

TABLE 9

Overlay Results for RIDOT/Gap Grade mixtures

| Test Result | Control 58-28 | Control + 10% Wet Process Rubber | Control + 10% Dry GTR Mix | Control + 10% Disclosed Rubber Composition |
|---|---|---|---|---|
| Average Overlay Test (OT) Cycles to Failure | 1466 | 381 | 230 | 1645* |

*The disclosed rubber composition out performs all other rubber modifiers by a factor of 4.3X and even provides better results than the control.

No other rubber or polymer modifier can provide this elevated level of performance and simultaneously perform well in the Hamburg Test. The exceptional performance of the disclosed rubber composition in the Gap Grade Overlay test may even allow the use of thinner top layers.

Example 5

Thermal Stress Test

The mixes were subjected to the Thermal Stress Restrained Specimen Test (TSRST) to determine crack resistance at low temperatures. The Superpave/Dense Grade mix test results are in Table 10 and the RIDOT/Gap Grade test results are in Table 11.

TABLE 10

TSRST Results for Superpave/Dense Grade Mixtures

| Binder | Control | Control + 10% Wet Process Rubber | Control + 10% Disclosed Rubber Composition |
|---|---|---|---|
| TSRST Cracking Temperature (° C.) | −24.75 | −28.70 | −29.30 |

1) Goal is a minimum of −28° C. (Results outside of 3° C. are significant).
2) The control fails this test.
3) Comparative TSRST results, indicate that the disclosed rubber compositions improved low temperature cracking in the Dense Grade mix.

TABLE 11

TSRST Results for RIDOT/Gap Grade Mixtures

| Binder | Control | Control + 10% Wet Process Rubber | Control + 10% Disclosed Rubber Composition |
|---|---|---|---|
| TSRST Cracking Temperature (° C.) | −24.30 | −27.99 | −28.50 |

1) Goal is a minimum of −28° C. Results outside of 3° C. are significant.
2) The control fails this test.
3) Comparative TSRST results, indicate that the disclosed rubber compositions improved low temperature cracking in the Gap Graded mix.

Example 6

Workability Test

Figure 4:
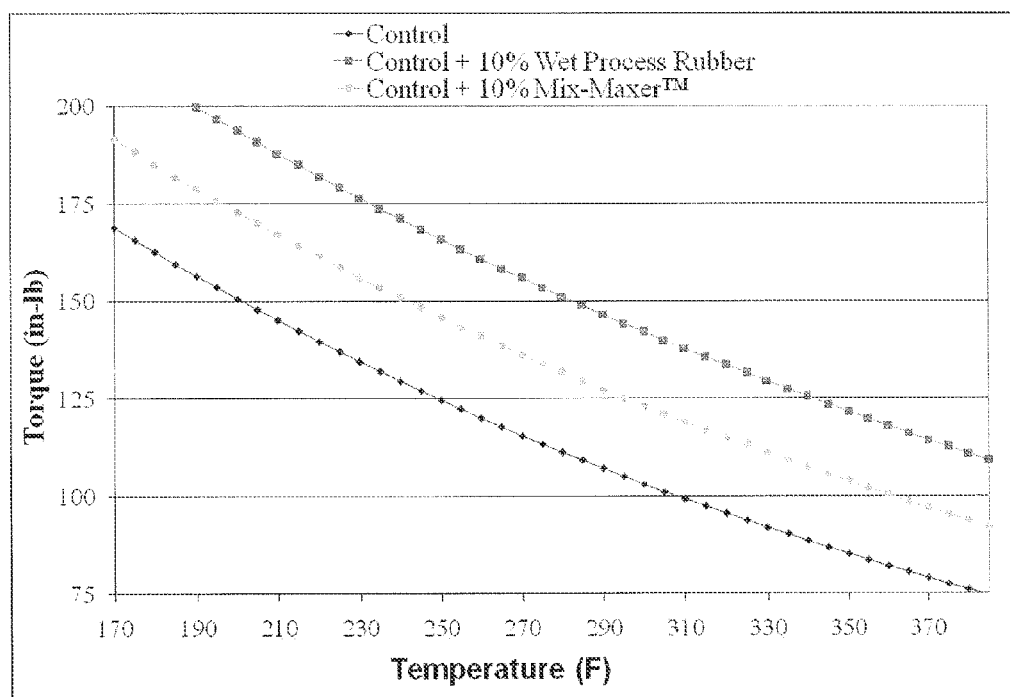
FIG. 4 shows comparisons of Superpave/Dense Grade workability. The workability test results indicate that a rubber composition as disclosed herein is more easily worked and handled in comparison to other rubber modified HMAs. The increased efficiency translates into better flow and improved compaction. A rubber composition as disclosed herein takes only half as much additional torque to work as other types of rubber modifiers.
Figure 5:
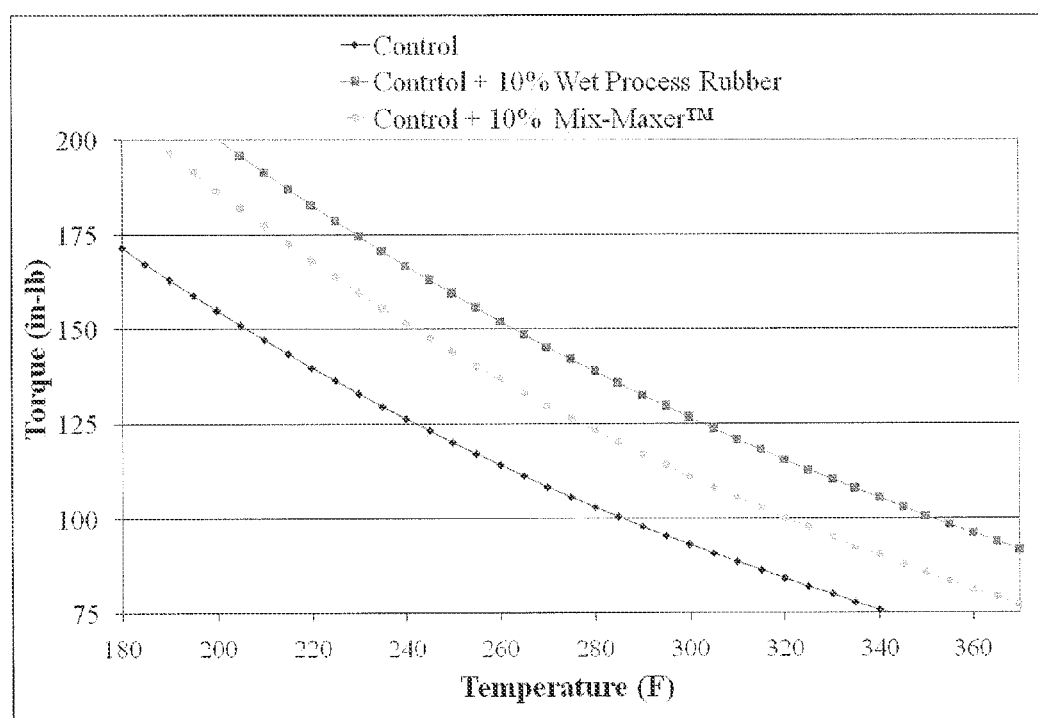
FIG. 5 is a comparison of RIDOT/Gap Grade workability. The test results indicate that the rubber composition disclosed herein is more efficient to work and handle in comparison to other rubber modified HMAs. The increased efficiency translates into better flow and improved compaction. The disclosed rubber composition takes only half as much additional torque to work as other types of rubber modifiers.

The mixes were subjected to a workability test that measures the torque required to work and handle the mix. This test was developed at the University of Massachusetts. The Superpave/Dense Grade mix test results are in FIG. 4 and the RIDOT/Gap Grade mix test results are in FIG. 5.

Example 7

Method of Producing and Using Rubber Composition

The disclosed rubber composition was made by first thoroughly coating a 30 mesh rubber with an oil chosen to mimic the maltenes naturally found in asphalts. This blend was then subjected to heating to bring the temperature to 350-375° F. and was held at this temperature for one hour. The rubber absorbs the oil during the holding period and each individual particulate swells in size by a factor of 2-3× its original size, like the size increase found when rubber is subjected to the wet process procedure. After the one hour holding period, the swollen rubber was cooled and surface-coated with a very high surface-to-volume ratio powder to render it flowable. It was then packaged in low melt, 50 lb polymer bags. The rubber utilized was a 30 mesh ambient ground rubber but this process works with a wide range of rubber mesh sizes.

The disclosed rubber composition was utilized by first mixing hot stone and asphalt as done in a standard mix plant. The requisite number of 50 lb bags of the rubber compositions disclosed herein was then fed into the rotating mix unit where the low melt packaging immediately melts, allowing the disclosed rubber composition to disperse evenly throughout the finished asphalt mix. All test formulations are in Tables 2 & 3.

What is claimed is:

1. A method of producing a rubber composition for use in paving mixtures, the method comprising: heating a crumb rubber with a maltene-like oil, in the substantial absence of a bituminous mixture, for from about 15 min to about 90 min at from about 250° F. to about 375° F. so that the maltene-like oil is absorbed in the crumb rubber and the crumb rubber is swelled to at least two times its original size, and isolating and cooling the swelled crumb rubber, wherein the composition provides simultaneous rut, crack, moisture, and temperature resistance in both dense grade and gap grade paving mixtures.

2. The method of claim 1, further comprising coating the composition with a powder, wherein the powder comprises a surface to volume ratio of less than that of a 20 micron particle.

3. The method of claim 1, wherein the crumb rubber comprises ambient ground crumb rubber.

4. The method of claim 1, wherein the crumb rubber is cryogenically ground rubber.

5. The method of claim 1, wherein the crumb rubber has a sieve designation of from about 4 mesh to about 240 mesh.

6. The method of claim 1, wherein the crumb rubber has a sieve designation of from about 10 mesh to about 80 mesh.

7. The method of claim 1, wherein the maltene-like oil comprises small molecular weight resins.

8. The method of claim 1, wherein the maltene-like oil comprises aromatic hydrocarbons with or without O, N, and S.

9. The method of claim 1, wherein the maltene-like oil comprises straight chained or cyclic unsaturated hydrocarbons.

10. The method of claim 1, wherein the maltene-like oil comprises cyclic saturated hydrocarbons.

11. The method of claim 1, wherein the maltene-like oil comprises straight or branch chain saturated hydrocarbons.

12. The method of claim 1, wherein the maltene-like oil comprises naphthene-aromatics.

13. The method of claim 1, wherein the maltene-like oil has a flash point in excess of about 400° F.

14. The method of claim 1, wherein the maltene-like oil is a fuel oil.

15. The method of claim 1, wherein the oil is a kerosene oil.

16. The method of claim 1, wherein the refined motor oil is a diesel fuel/oil.

17. The method of claim 1, wherein the maltene-like oil is #4, #5, #6 fuel oil.

18. The method of claim 1, wherein the maltene-like oil is a recycled oil.

19. The method of claim 1, wherein the composition is heated to from about 300° F. to about 375° F. for from about 15 minutes to about 1 hour.

20. The method of claim 1, wherein the composition is heated to from about 300 to about 350° F. for from about 30 minutes to about 75 minutes.

21. The method of claim 1, wherein the composition is heated via microwave.

22. The method of claim 1, wherein the mixture is stirred during heating.

23. The method of claim 22, wherein the mixture is stirred with a paddle mixer.

24. The method of claim 1, wherein the swelled crumb rubber is cooled between about 1 and about 24 hours.

25. The method of claim 2, wherein the high surface-to-volume ratio powder is from about a 0.5 to about 20 micron particle.

26. The method of claim 2, wherein the powder is sand, talcum powder, bentonite clay, 200 mesh rubber, hydrated lime or ADVERA™ WMA.

27. The method of claim 1, wherein the crumb rubber is swelled 2 to 3 times its original size.

28. The method of claim 1, wherein the swelled crumb rubber is cooled at ambient temperature.

29. The method of claim 1, wherein the swelled crumb rubber is cooled in a cooling chamber.

30. A method of producing a rubber composition for use in paving mixtures, the method comprising: heating a composition consisting essentially of a crumb rubber and a maltene-like oil, in the substantial absence of a bituminous mixture, so that the maltene-like oil is absorbed in the crumb rubber and the crumb rubber is swelled to at least two times its original size, and isolating and cooling the swelled crumb rubber, wherein the composition provides simultaneous rut, crack, moisture, and temperature resistance in both dense grade and gap grade paving mixtures.

\* \* \* \* \*